United States Patent
Satoyama et al.

(10) Patent No.: US 6,615,327 B1
(45) Date of Patent: Sep. 2, 2003

(54) METHOD AND SYSTEM FOR BACKING UP DATA OF DATA PROCESSING DEVICES INCLUDING FIXED LENGTH BLOCK FORMAT DATA CONVERSION TO VARIABLE LENGTH BLOCK FORMAT

(75) Inventors: Ai Satoyama, Sagamihara (JP); Akira Yamamoto, Sagamihara (JP); Takashi Oeda, Sagamihara (JP); Yasutomo Yamamoto, Sagamihara (JP); Masaya Watanabe, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/506,271

(22) Filed: Feb. 17, 2000

(30) Foreign Application Priority Data

Feb. 19, 1999 (JP) ............................. 11-041048

(51) Int. Cl.[7] .............................................. G06F 13/00
(52) U.S. Cl. ...................... 711/162; 711/112; 360/48; 714/7
(58) Field of Search .............................. 711/162, 112, 711/170, 173, 147, 4, 118; 360/48, 71, 135; 714/7

(56) References Cited

U.S. PATENT DOCUMENTS

| | | | | |
|---|---|---|---|---|
| 5,555,371 A | * | 9/1996 | Duyanovich et al. | 714/13 |
| 5,623,599 A | * | 4/1997 | Shomler | 714/18 |
| 5,664,144 A | * | 9/1997 | Yanai et al. | 711/113 |
| 5,734,818 A | * | 3/1998 | Kern et al. | 714/20 |
| 5,920,893 A | * | 7/1999 | Nakayama et al. | 360/48 |
| 6,041,386 A | * | 3/2000 | Bello | 711/112 |
| 6,052,758 A | * | 4/2000 | Crockett et al. | 711/113 |
| 6,115,797 A | * | 9/2000 | Kanda et al. | 711/112 |
| 6,173,377 B1 | * | 1/2001 | Yanai et al. | 711/154 |

FOREIGN PATENT DOCUMENTS

JP              6-150557              5/1994

OTHER PUBLICATIONS

"Mainframe 98," Nikkei BP Corp., pp. 53–54.
"Mainframe 98", Nikkei BP Corp., pp. 126–130, 145, 151.

* cited by examiner

*Primary Examiner*—Hong Kim
(74) *Attorney, Agent, or Firm*—Mattingly, Stanger & Malur, P.C.

(57) ABSTRACT

In a computer system that includes a first computer, a second computer, a first storage apparatus storing data in a fixed-length block format used by the second computer, and a backup apparatus connected to the first computer and storing data in a variable-length block format, the present invention provides a backup method for backing up data stored in the first storage apparatus to the backup apparatus. The first computer sends the second computer a request to read data in the fixed-length block format. In response to this request, the second computer reads the fixed-length block format data from the first storage apparatus and transfers this data to the first computer. The first computer converts the transferred fixed-length block format data into variable-length block format data. The converted variable-length block format data is stored in the backup apparatus.

15 Claims, 9 Drawing Sheets

METHOD AND SYSTEM FOR BACKING UP DATA OF DATA PROCESSING DEVICES INCLUDING FIXED LENGTH BLOCK FORMAT DATA CONVERSION TO VARIABLE LENGTH BLOCK FORMAT

CROSS-REFERENCE TO RELATED APPLICATION

This application is related to U.S. patent application Ser. No. 08/912,872 filed Aug. 19, 1997, now U.S. Pat. No. 6,115,797, the subject matter of which is incorporated herein by reference.

BACKGROUND OF THE INVENTION

The present invention relates to a method for backing up and restoring data stored in storage apparatuses in computer systems.

Disk arrays are generally used as storage apparatuses in computer systems to provide high performance and a high degree of reliability. In "open systems" such as work stations and personal computers (PCs), fixed-length block formats are used as the format with which to record data to external storage apparatuses such as disk storage apparatuses. Thus, fixed-length access interfaces are generally used in the interfaces between the open systems and disk array controllers. Fixed-length access interfaces are also used for the individual disk storage apparatuses within a disk array.

In general-purpose large-scale computers (hereinafter referred to as mainframes), variable-length block formats are used to record data to magnetic disk storage apparatuses. For this reason magnetic disk storage apparatuses are accessed using variable-length access interfaces, e.g., CKD (Count Key Data), that allow access to variable-length block format data. Conventionally, data in variable-length block formats has been physically recorded on disk storage apparatuses having variable-length access interfaces. However, in recent years there has been widespread use of disk arrays, formed from relatively inexpensive disk storage apparatuses used in PCs and workstations, as storage apparatuses for the recording of data using variable-length block formats.

In mainframe disk arrays, data is generally recorded to individual disk storage apparatuses using a fixed-length block format known as FBA (Fixed Block Architecture), as can be seen in "Mainframe '98" (Nikkei BP Corp., pp. 126–130). Disk array controllers are equipped with a conversion function that uses cache memory to convert between fixed-length block formats and variable-length block formats. Mainframes and disk controllers are connected using a variable-length access interface. Read/write requests from a mainframe are formed from a plurality of input/output commands known as CCWs (Channel Command Words). This plurality of CCWs is known as a CCW chain. CCW chains are created by the mainframe's operating system in response to requests from applications.

Magnetic disk storage apparatuses are generally installed external to a mainframe as a disk subsystem formed from a disk controller and a disk storage apparatus. To read or write data to the disk storage apparatus, the mainframe sends the disk subsystem using a command based on a variable-length block format. The disk controller in the disk subsystem receives the command specified by the mainframe and converts the data from the variable-length block format to a fixed-length block format in order to allow access to the disk storage apparatus. This type of conversion from variable-length format to fixed-length format is described, for example, in Japanese laid-open patent publication number Hei 6-150557.

Computer centers today often include both mainframes and open systems. In such settings, there has been a need to allow easy management of disk arrays by storing the data accessed by the mainframes and the open systems together, thus centralizing the disk array. A technology that meets this need is described in page 145 or page 151 of "Mainframe '98" (Nikkei BP Corp.), where an open system can access mainframe data stored in a disk array equipped with both a variable-length access interface and a fixed-length access interface. For the mainframe data, variable-length/fixed-length block format conversion is performed within the disk array, and the data is stored in a disk storage apparatus using the fixed-length block format. The mainframe data stored in the disk storage apparatus is retrieved by an open-system server via the fixed-length block format interface. The data is retrieved in the same form as it is stored on the disk storage apparatus. Furthermore, by using a backup/restore option on the mainframe, a volume in the disk array for use by an open system can be read by the mainframe as a volume image and backed up. Also, the mainframe can restore the backed up data to the volume for use by the open system. Use of this feature does not require installation of special software on the mainframe or the open system. To allow the fixed-length block format data from the open-system volume to be accessed by the mainframe, the disk array controller converts the data to the variable-length block format. The backup destination can be an existing tape library apparatus, magnetic tape, disks, etc. When an open-system volume in the disk array is initialized, a volume serial number and volume information is created for the volume. The volume serial number and the volume information written to the volume during initialization is written to an area separate from the area in which the open-system data is written. Thus, the open-system data is not destroyed. Data stored in other disk storage apparatuses connected to the server connected to the disk array as well as data stored in disk storage apparatuses connected to other servers/clients on the network are backed up using backup programs or system commands on the open systems. The data is backed up in backup/restore volumes in the disk array. Volume information and volume serial numbers are created for the backup/restore volumes during initialization. Data that has been backed up to a backup/restore volume can, as described above, then be backed up to a tape library apparatus or the like using the mainframe's backup feature.

There has also been the emergence of the use of SCSI interfaces, which are fixed-length access interfaces, as the interface for external storage apparatuses used for general-purpose data processing devices. For example, in pp. 53–54 of "Mainframe '98" (Nikkei BP Corp.), an internal disk storage apparatus is described where a disk storage apparatus that uses a fixed-length block format is mounted inside the case of a data processing device. A set of commands (CCW) for reading/writing data using the variable-length block format generated by the operating system is interpreted by a processor, referred to as an SAP, which converts these commands to a set of commands (SCSI commands) for reading/writing data using the fixed-length block format, and input/output operations are performed on the internal disk. In the data stored in the internal disk storage apparatus, data in the variable-length block format is embedded in fixed-length block format data. This conversion of data formats is performed by the SAP.

SUMMARY OF THE INVENTION

With the conventional technology described above, taking data from an external storage apparatus shared by open systems and mainframes and having the open system back the data up to a mainframe's backup storage requires the data to be copied to a backup volume in the external storage apparatus shared with the mainframe. Thus, each time a backup is to be made, a backup volume must be created. This means that a single backup requires two backup operations. This requires allocation of storage capacity and backup processing.

The object of the present invention is to reduce the size of the backup volumes used in backup operations and to provide a method for performing backups that reduces the overhead involved in backup operations. In order to achieve the objects described above, the first form of the present invention is described as follows. In a computer system that includes a first computer, a second computer, a first storage apparatus storing data in a fixed-length block format used by the second computer, and a backup apparatus connected to the first computer and storing data in a variable-length block format, a backup method for backing up data stored in the first storage apparatus to the backup apparatus is provided. The first computer sends the second computer a request to read data in the fixed-length block format. In response to this request, the second computer reads the fixed-length block format data from the first storage apparatus and transfers this data to the first computer. The first computer converts the transferred fixed-length block format data into variable-length block format data. The converted variable-length block format data is stored in the backup apparatus. The second form of the present invention is described as follows. In a computer system that includes a first computer, a second computer, a storage apparatus storing data in a fixed-length block format used by the second computer, and a backup apparatus connected to said first computer and storing data in a variable-length block format, a backup method for backing up data stored in the first storage apparatus to the backup apparatus is provided. Volume information used to allow the first computer to access fixed-length block format data is stored in a region distinct from a region in which the fixed-length block format data is stored. Based on information contained in the volume information, the first computer reads the fixed-length block format data from the storage apparatus. In the first computer, the fixed-length block format data is converted to variable-length block format data. The first computer takes the data converted to the variable-length block format and stores it in the backup apparatus.

DESCRIPTION OF THE PREFERRED EMBODIMENTS

Figure 1:
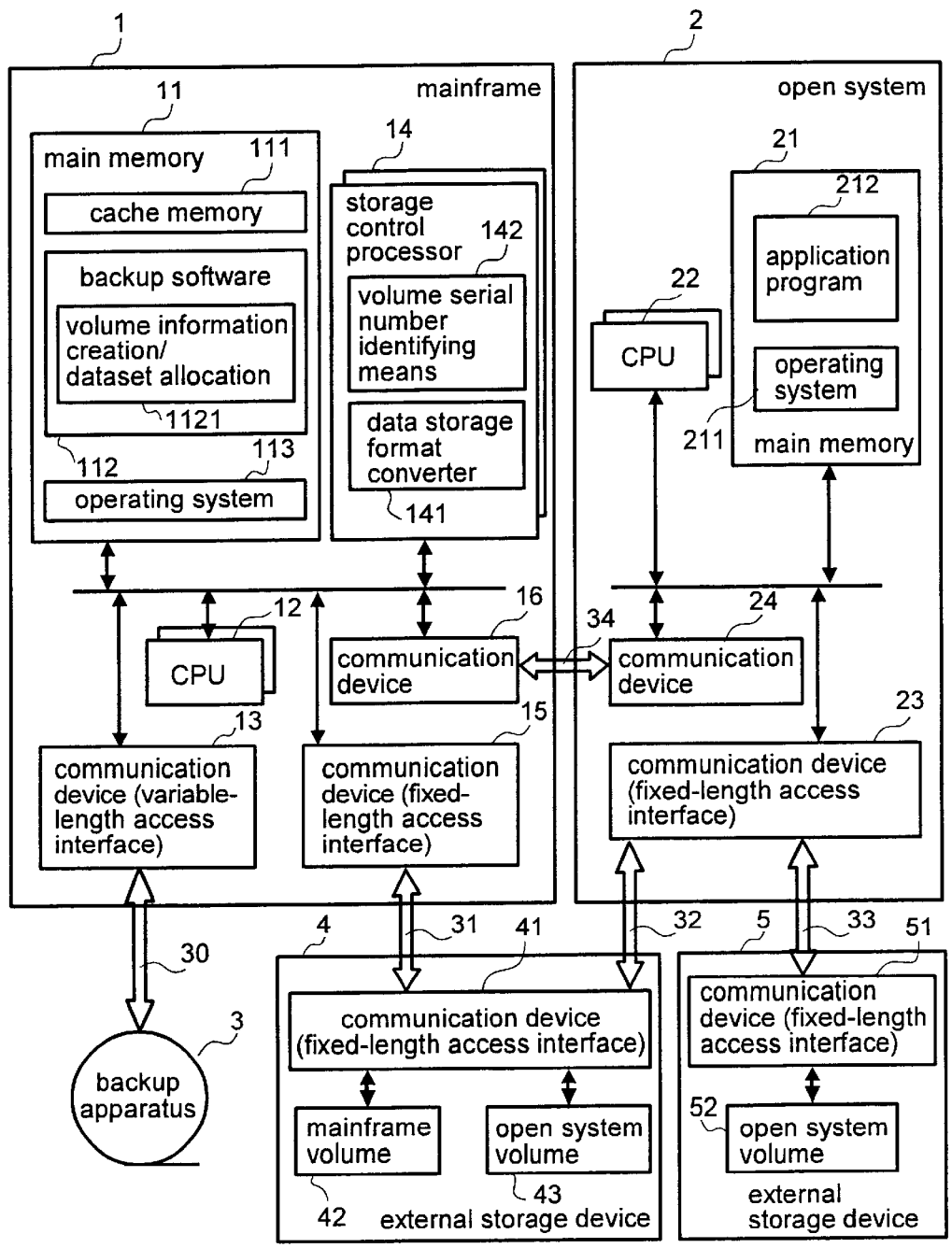
FIG. 1 is a schematic block diagram of a computer system according to an embodiment of the present invention.

FIG. 1 is a schematic block diagram of a computer system according to an embodiment of the present invention. A mainframe 1 includes: at least one central processing unit (CPU) 12; a main memory 11; communication units (I/O channels) 13, 15, 16 for controlling data transfers with other data processing devices; and at least one storage control processor 14. The I/O channel 13 includes a variable-length access interface and is connected to a backup apparatus 3 via a communication line 30. The I/O channel 15 includes a fixed-length access interface and is connected to an external storage apparatus 4 via a communication line 31. The fixed-length access interface used between the I/O channel 15 and the external storage apparatus 4 can be, for example, a SCSI (Small Computer System Interface) interface or a fiber channel, formed from optical cable, that uses the SCSI protocol. Besides the areas for storing data and programs used by the CPU 12, the main memory 11 includes a cache memory 111 used when data is sent to or received from the external storage apparatus 4. The cache memory 111 serves as a disk cache. The storage control processor 14 includes a data format converter 141 that provides conversion between the variable-length block format and the fixed-length block format. In this embodiment, the data format converter 141 is implemented as a program that is executed by the storage control processor 14. The storage control processor 14 controls data transfers between the external storage apparatus 4 and the main memory 11. Data read from the external storage apparatus 4 and data from the CPU 12 to be written to the external storage apparatus 4 is stored in the cache memory 111. The data is stored in the cache memory 111 using the same fixed-length block format used by the external storage apparatus 4.

The open system 2 is a server apparatus including: a central processing unit (CPU) 22; a main memory 21; and communication units (I/O channels) 23, 24 for controlling data transfers with other data processing devices. The I/O channel 23 and the I/O channel 13 are variable-length access interfaces. The mainframe 1 and the open system 2 are connected by the I/O channel 16 and the I/O channel 24 via a communication line 34. The I/O channel 23 includes a fixed-length access interface and is connected to the external storage apparatus 4 via a communication line 32. The I/O channel 23 is also connected to an external storage apparatus 5 via a communication line 33.

The mainframe 1 acts as the server for the external storage apparatus 4. The external storage apparatus 4 stores data using the fixed-length block format and includes a fixed-length access interface. The external storage apparatus 4 can be either a single disk storage apparatus or a RAID (Redundant Array of Inexpensive Disks) having a fixed-length access interface. The external storage apparatus 4 includes a mainframe volume 42 and an open-system volume 43. The mainframe volume 42 is a volume for storing data from the mainframe 1 and can be accessed only from the mainframe 1. The open-system volume 43 is initialized by a volume information creation/data set allocation module 1121 of the mainframe system 1. In this initialization operation, volume information and a volume serial number are created for the open-system volume 43.

The backup apparatus 3 can be, for example, an MT library apparatus that uses magnetic tape (MT) as the recording medium. It would also be possible to use a disk storage apparatus instead of an MT library apparatus for the backup apparatus 3.

Figure 2:
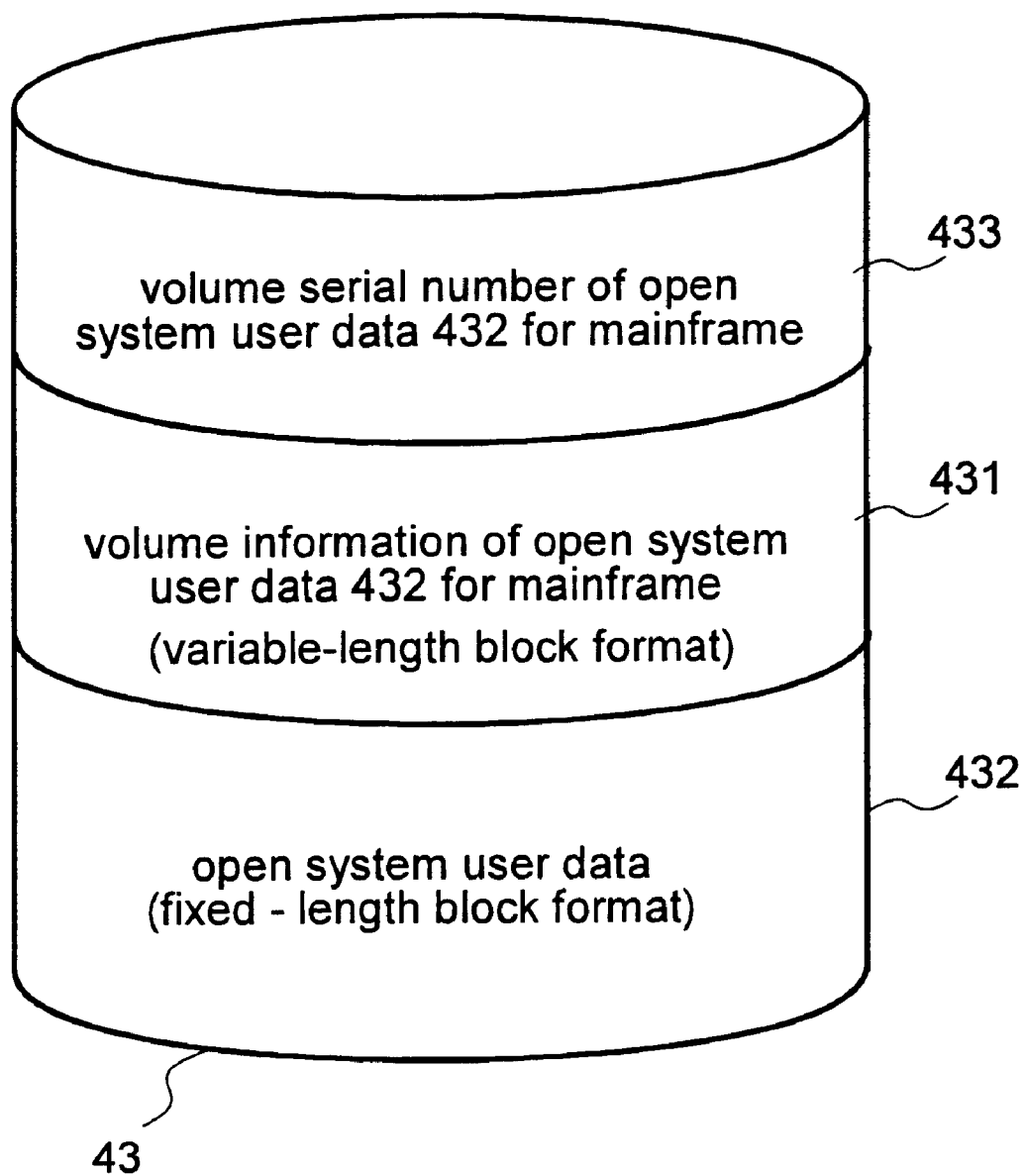
FIG. 2 is a schematic diagram showing the logical structure of an open-system volume.

FIG. 2 is a schematic diagram showing the logical structure of the open-system volume 43. The open-system volume 43 contains volume information 431 and a volume serial number 433. The volume information 431 contains information used to identify the start and end positions of user data 432 in the volume 43. The volume serial number 432 is an identifier assigned to distinguish the volume 43 from other volumes. The volume information 431 and the volume serial number 433 are written to an area separate from the area in which the open-system user data 432 is written. Thus, the user data 432 for the open system is not destroyed. By creating the volume information 431 and the volume serial number 433, the open-system volume 43 allows access from the mainframe 1. However, only a backup/restore program 112 can be used to access the open-system volume 43 from the mainframe 1. The volume information 431 is stored in the variable-length block format, and the user data for the open-system is stored in the fixed-length block format. In addition to what is described above, the volume information 431 and the volume serial number 433 can also be stored in another volume independent from the open-system volume 43 or in the cache memory 111 of the mainframe 1.

The volume information and the volume serial number which are needed to back up data from the open-system volume 52 in the external storage apparatus 5 are created in the mainframe 1 or in the external storage apparatus 4. The operating system 113 makes it appear as though the volume exists in the mainframe 1 or the external storage apparatus 4. Volume serial number identifying means 142 in the storage control processor 14 is used to determine where the actual volume is located. The storage control processor 14 uses the volume serial number to select an operation based on the storage location. If the volume is in the external storage apparatus 4, the backup operation is performed directly on the volume. If the volume is in the external storage apparatus 5, the data to be backed up is retrieved via the open system 2 connected to the external storage apparatus 5.

Figure 3:
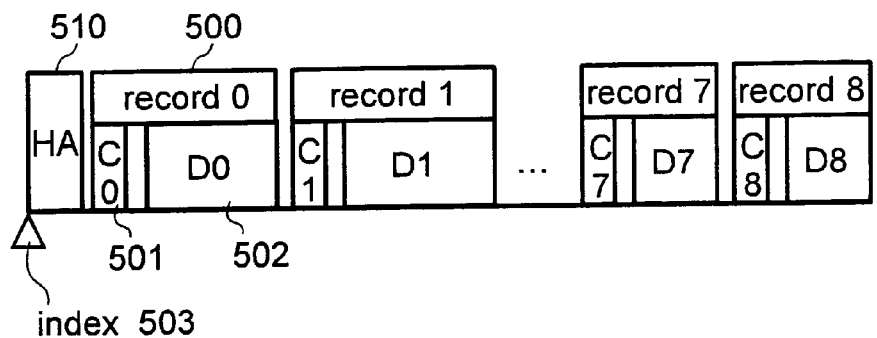
FIG. 3 is a schematic diagram showing the track format used in a variable-length block format.

FIG. 3 is a schematic diagram showing the track format used in the variable-length block format. The figure shows a sample structure of a single track. The track is formed from a single home address (hereinafter abbreviated as HA) 510 and at least one record 500. The HA 510 is the first field positioned at the start of each track and contains information such as the track number. The record 500 includes multiple fields: a count field 501 and a data field 502. In some cases a key field (not shown in the figure) may be present in front of the data field 502. The count field 501 is a fixed-length field that contains information such as the address of the record 500, the lengths of subsequent fields (the data field 502 and the key field), and the like. Each of the records 500 can be a variable-length record. In other words, the length of the data field 502 can be different for each record 500. Thus, the count field 501 stores the length of the key field and the data field 502 of the record. By looking at the count field 501, the lengths of the fields in the record 500 can be determined. The address of the record 500 is indicated by a cylinder number, a head number, and a record number, i.e., a number assigned sequentially from the start of a track. Tracks have fixed lengths but records have variable lengths, so the number of records contained in each track varies.

Figure 4:
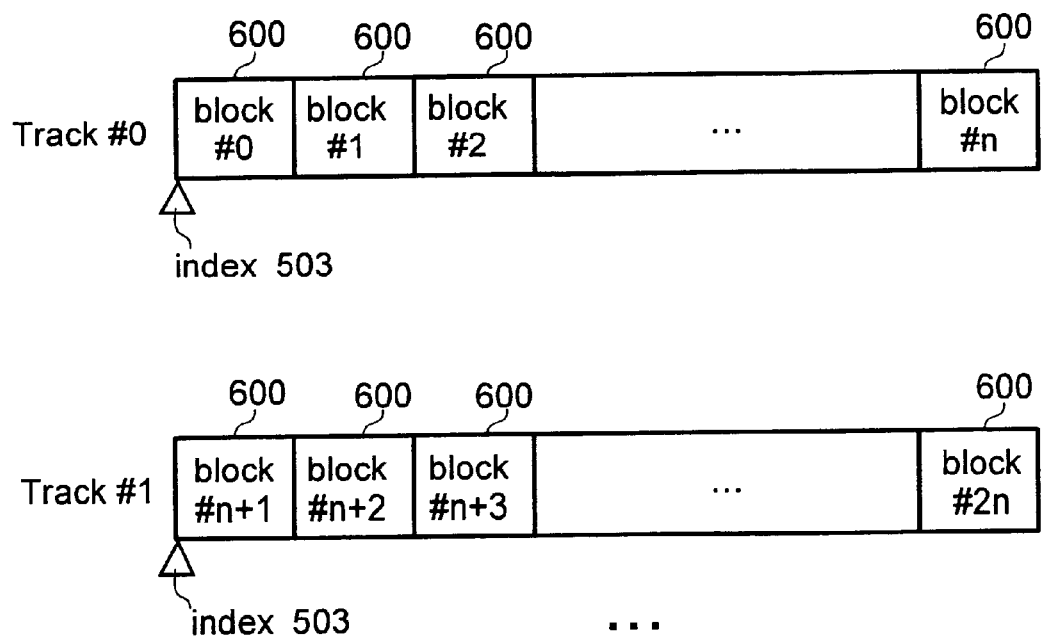
FIG. 4 is a schematic diagram showing the track format used in a fixed-length block format.

FIG. 4 is a schematic diagram showing a track format used in the fixed-length block format. In fixed-length storage apparatuses, each track is formed from regions (hereinafter referred to as blocks) 600 having a predetermined fixed length. Each block 600 is assigned a unique number in the storage apparatus. Access to the storage apparatus is performed using the number of the leading block 600 of a region and the number of subsequent blocks 600.

Figure 5:
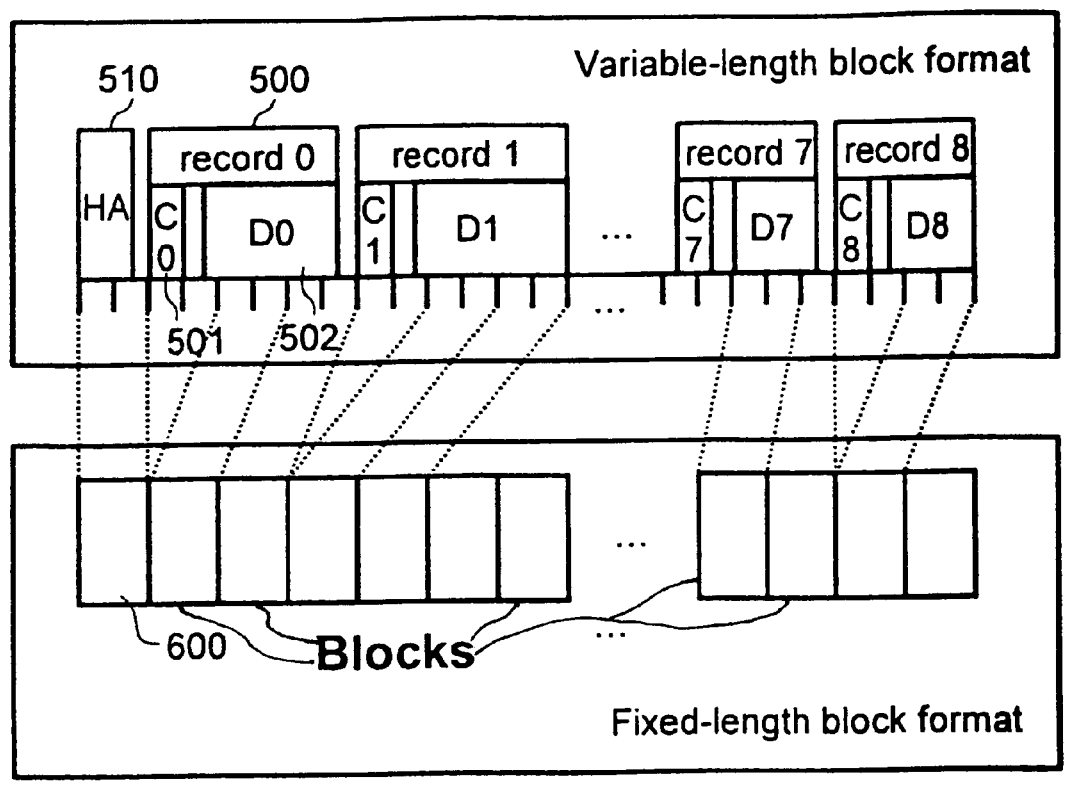
FIG. 5 is a drawing for the purpose of describing the conversion of data in a variable-length block format to data in a fixed-length block format.

FIG. 5 is a drawing for the purpose of describing the conversion of data in a variable-length block format to data in a fixed-length block format. When each track represented in the variable-length block format is converted, it is split into regions having the same size as the fixed-length blocks 600. The leading region of the leading track indicated by cylinder number 1 and head number 0 is assigned to the leading block 600 indicated by the number 0. Subsequent regions on the track are assigned to subsequent blocks 600. Once all the regions in the leading track have been assigned, the leading region of the next track, i.e., cylinder number 1, head number 1, is assigned to the subsequent block 600. At this point, the count field 501 of the variable-length block format is discarded rather than saved. In this manner, all regions of all tracks are associated to the blocks 600. The volume information is stored in cylinder number 0. If the mainframe volume 42 and the open-system volume 43 have the same track format in the external storage apparatus 4, the same data format converter 141 can be used for backing up the open-system volume 43 from the mainframe 1 as well as for backing up the mainframe volume 42. Thus, it would be desirable to use the same track format for both the mainframe volume 42 and the open-system volume 43. Since the open-system data, e.g., SCSI data, does not contain a count field, the track format of the mainframe data is made to conform to the track format of the open-system data. When the mainframe issues a read request, the data format converter 141 of the storage control processor 14 generates a count field. When the mainframe 1 issues a write request, the count field is discarded and only the data field is stored. Since the tracks have a fixed length, the number of fixed-length blocks 600 that can be placed in a single track is determined by the track size divided by the block size. The block number of the leading block 600 holding a track can be determined from the track address as follows: "(cylinder number×number of heads+head number)×total number of blocks in a track".

For normal use of data in the external storage apparatus 4 by the open system 2, the open system 2 reads data directly from the open-system volume 43 in the external storage apparatus 4 in response to a read request issued from an application program 212. Backups of the main-frame volume 42 and the open-system volume 43 in the external storage apparatus 4 are made in the following manner.

Figure 6:
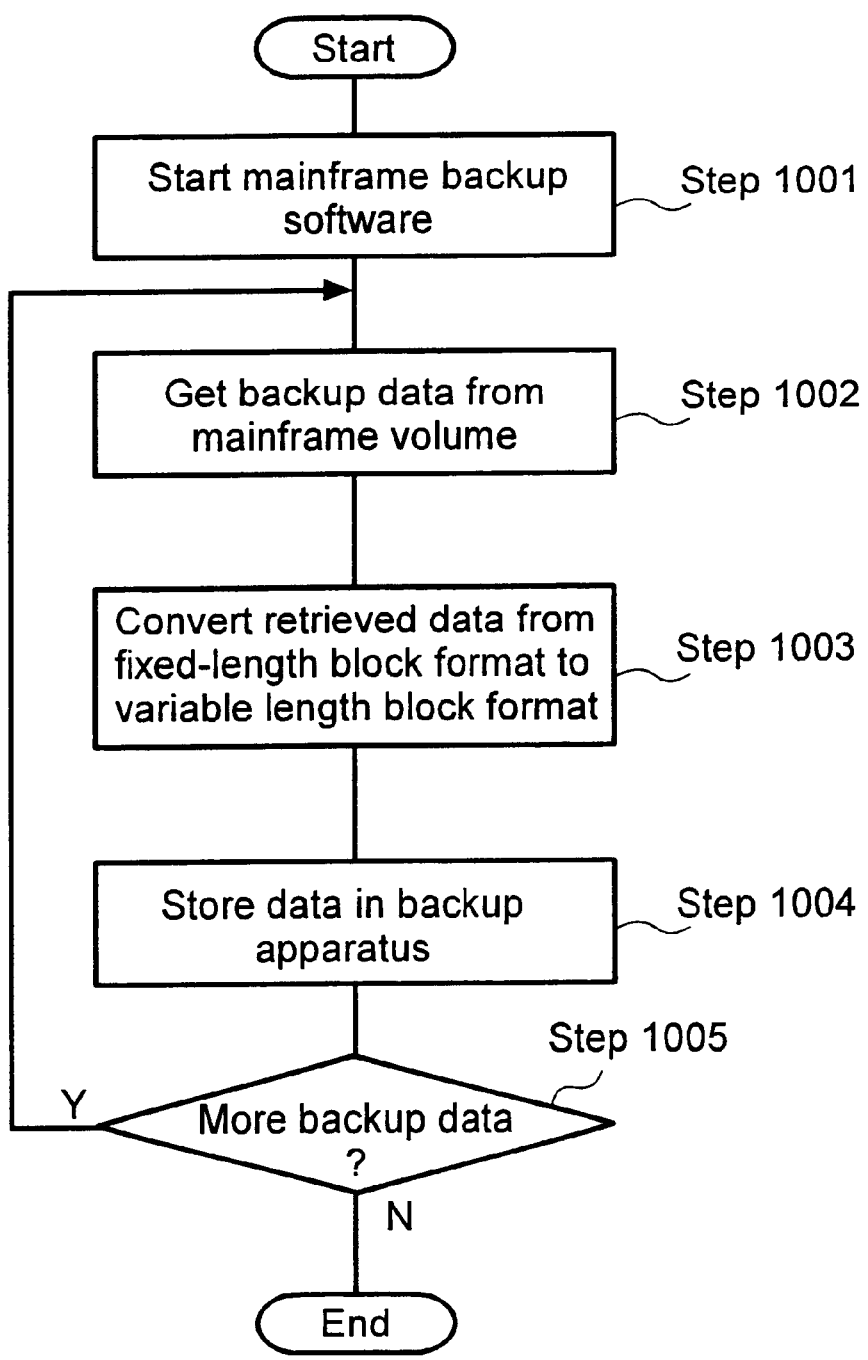
FIG. 6 is a flowchart of the operations performed during a backup of a mainframe volume.

FIG. 6 is a flowchart showing the operations performed when the mainframe 1 makes a backup of the mainframe volume 42. To back up the mainframe volume 42, first the backup software 112 is started (step 1001). The backup software 112 reads the backup data from the mainframe volume 42 (step 1002). The data format converter 141 of the storage control processor 14 takes this backup data and converts it from the fixed-length block format to the variable-length block format (step 1003). The data that has been converted to the variable-length block format is stored in the backup apparatus 3 connected to the mainframe 1 (step 1004). The backup software 112 checks to see if there is any more data to be backed up. If there is, the operations from step 1002 through step 1004 are repeated to continue the backup operation. If all the data has been backed up, the backup operation is finished (step 1005).

As with the backup operation, the restoring of backed up data is performed by the backup software 112. The backup software 112 uses the data format converter 141 to take the backup data stored in the backup apparatus 3 and convert it from the variable-length block format to the fixed-length block format. This is then stored in the mainframe volume 42.

Figure 7:
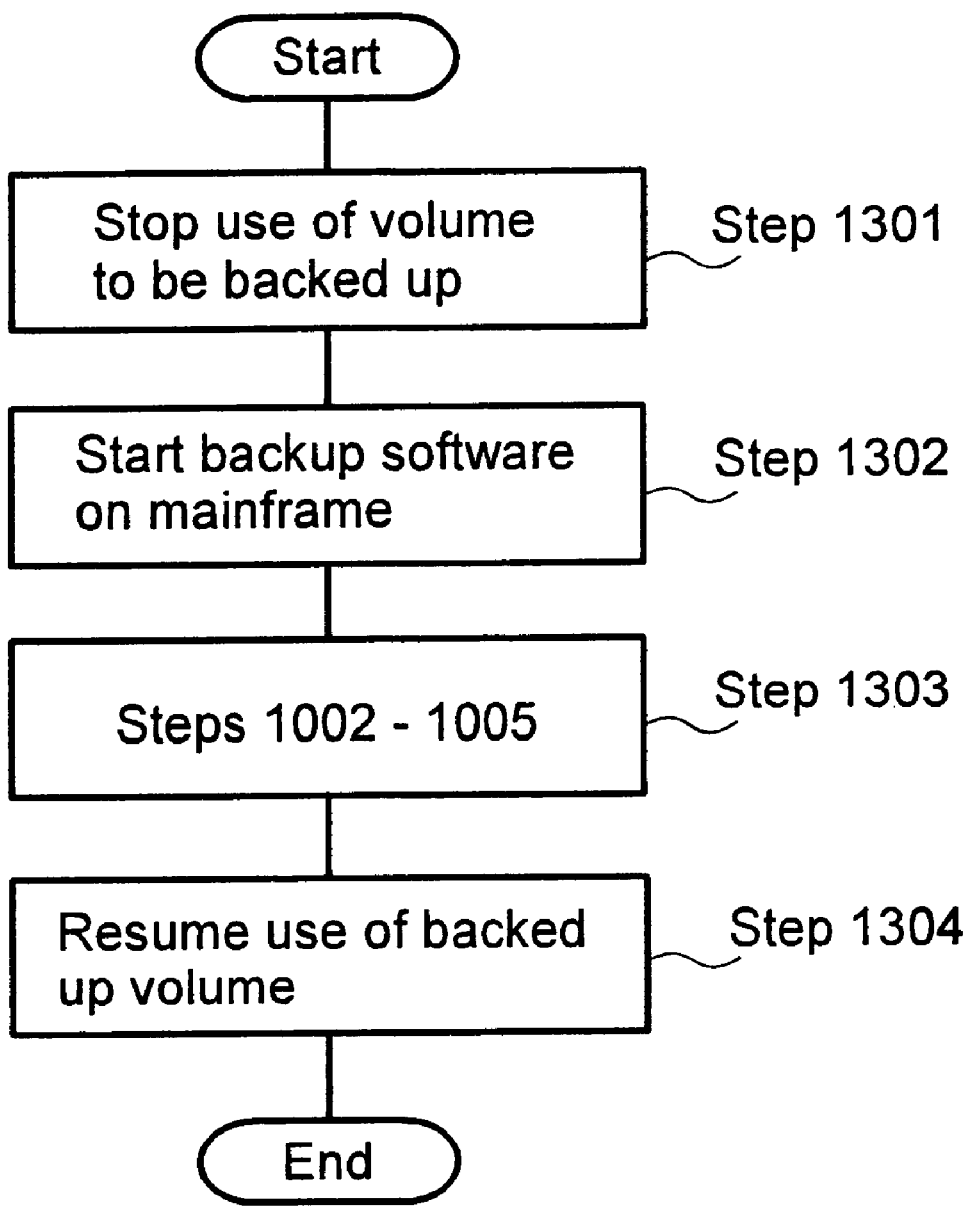
FIG. 7 is a flowchart of the operations performed during a backup of an open-system volume.

FIG. 7 is a flowchart showing the operations performed when the mainframe 1 backs up the open-system volume 43. In the backup operation for the open-system volume 43, first all operations on the open system 2 that use the volume to be backed up are halted, and the volume 43 is unmounted (step 1301). The backup software 112 of the mainframe 1 is then started. The backup software 112 receives from the user a volume serial number corresponding to the device filename of the volume 43 used by the open system 2 and begins backing up data (step 1302). Then, operations similar to those of step 1002–step 1005 described above are performed to make the backup (step 1303). Once all the data has been stored in the backup apparatus 3, the volume 43 is mounted to the open system 2 and the open system 2 resumes operations (step 1304).

The restore operation for the open-system volume 43 is performed in a similar manner as the restore operation for the mainframe described above.

Figure 8:
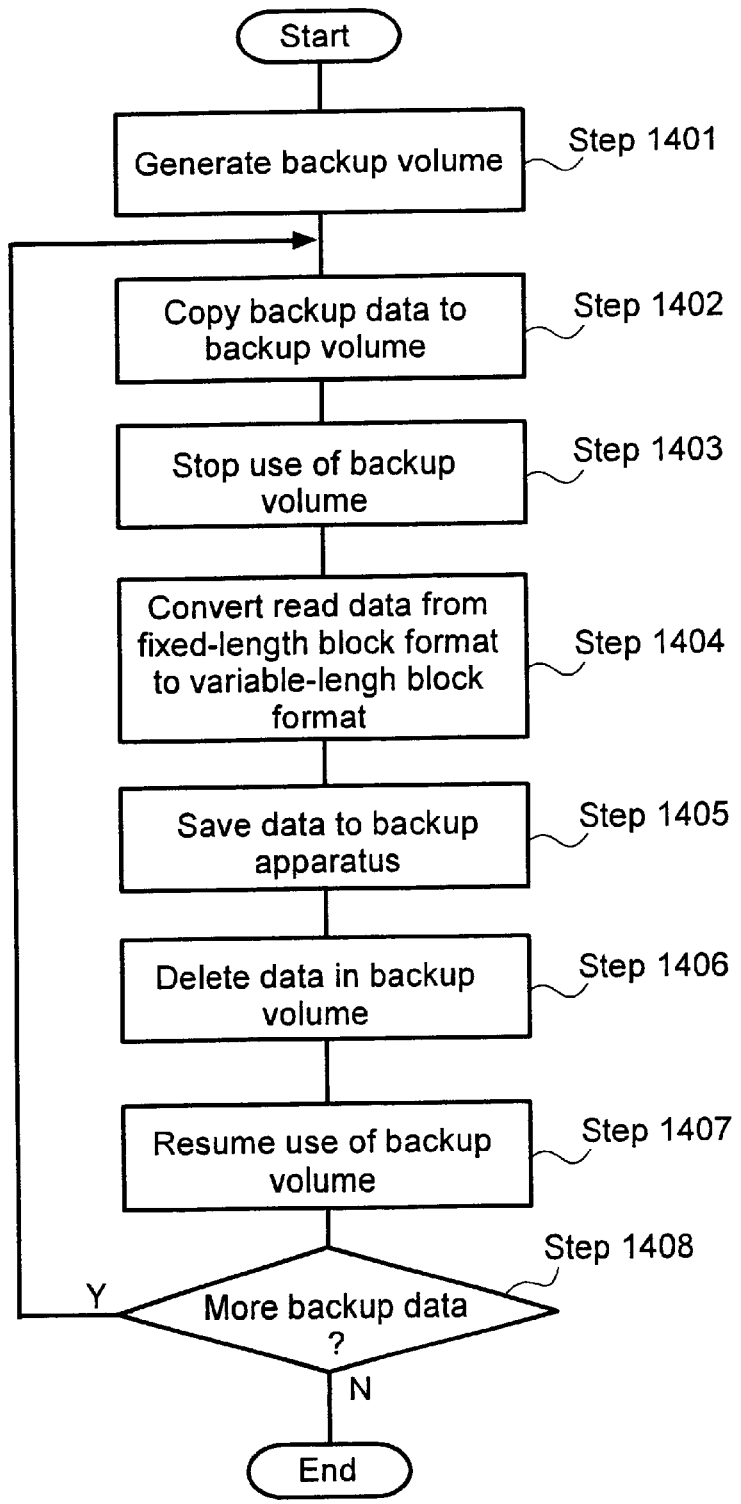
FIG. 8 is a flowchart of the operations performed during a backup of an external storage apparatus used exclusively by an open system.

FIG. 8 is a flowchart of the operations performed when data from the open-system volume 52 in the external storage apparatus 5 is backed up to the backup apparatus 3. The data in the volume in the external storage apparatus 5 cannot be accessed directly from the mainframe 1 and is first copied to the external storage apparatus 4 before being saved to the backup apparatus 3.

In the backup operation for the open-system volume 52, first a backup volume is created in the external storage apparatus 43. The volume information creation/data set allocation module 1121 generates a volume serial number and volume information for the backup volume, and these are saved in the cache memory 111 or the external storage apparatus 4. The backup volume, the volume serial number, and the volume information are generated based on user specifications (step 1401). Then, the open system 2 uses its backup program or system commands in order to copy the data to be backed up from the open-system volume 52 to the backup volume in the external storage apparatus 4. This operation is known as a temporary backup. The copying performed here can be performed, for example, on a file-by-file basis. This involves copying multiple files that will fit in the capacity of the backup volume (step 1402). After copying the backup data, the operations being performed by the open system 2 are halted and the backup volume is unmounted from the open system 2 (step 1403). Next, the backup software 112 of the mainframe 1 specifies the backup volume and reads data. The data format converter 141 of the storage control processor 14 takes the data read from the backup volume and converts it from the fixed-length block format to the variable-length block format while generating a virtual C field (step 1404). The data converted into the variable-length block format is stored in the backup apparatus 3 (step 1405). After all the data from the files that were temporarily backed up to the backup volume have been stored in the backup apparatus 3, the files that were copied to the backup volume are all deleted so that the backup volume can be used as the temporary backup destination for the next backup (step 1406). The backup volume 44 is mounted to the open system 2, allowing the backup volume to be accessed from the open system 2 (step 1407). The volume 52 is checked to see if there is data that needs to be backed up. If there is data remaining to be backed up, the operations starting with step 1402 are repeated. If there is no more data to be backed up in the volume 52, the backup operation is finished (step 1408).

To restore the backed up data, the data is converted from the variable-length block format to the fixed-length block format. The data is then passed on to the open system 2 via the backup volume and is saved in the open-system volume 52.

Figure 9:
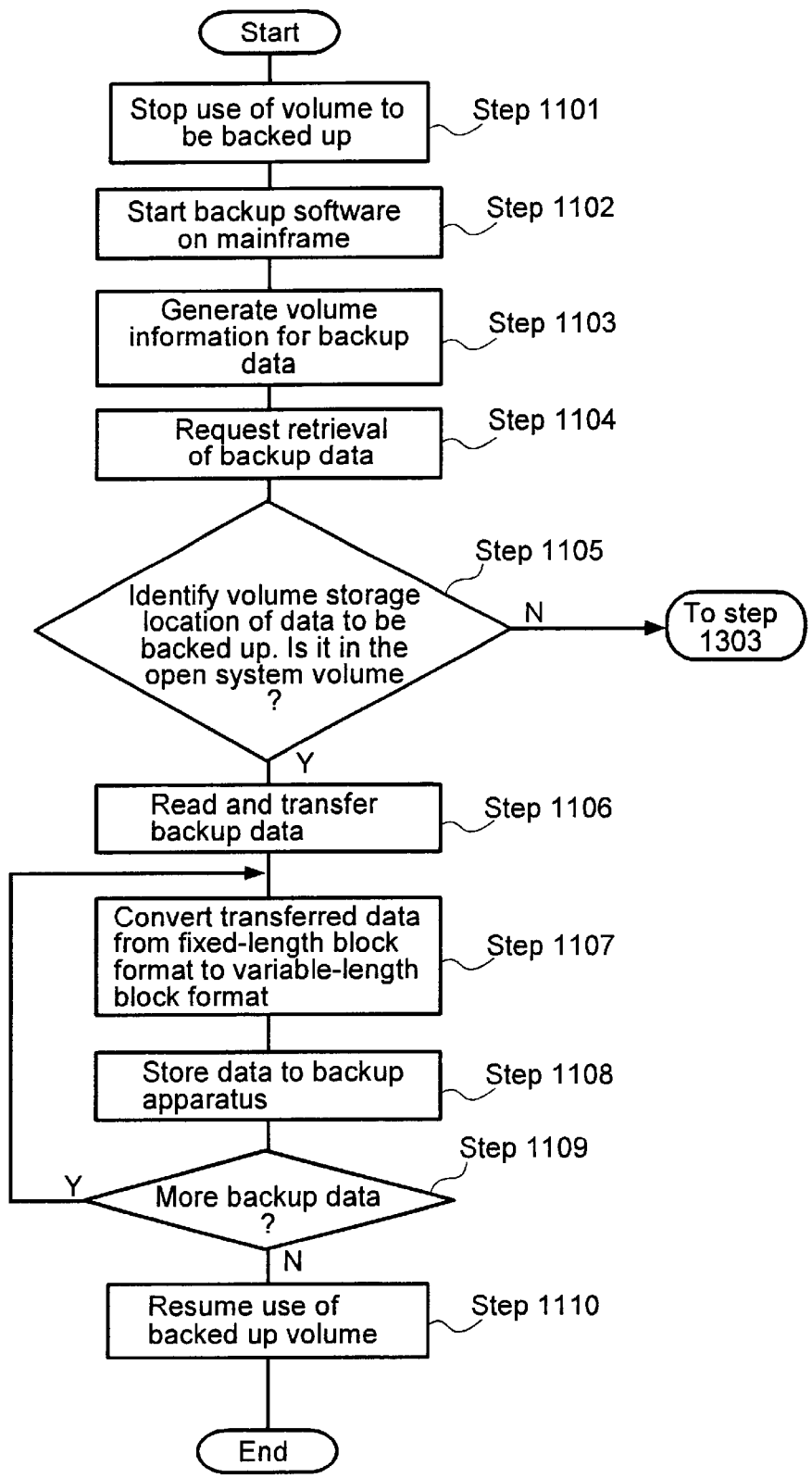
FIG. 9 is a flowchart from another embodiment showing the operations performed during a backup of data stored in an external storage apparatus used exclusively by an open system.

FIG. 9 is a flowchart showing the operations performed in a backup operation according to a second embodiment where data from the open-system volume 52 of the external storage apparatus 5 is backed up to the backup apparatus 3. In the operation shown in FIG. 9, the storage control processor 14 makes a backup using the volume information 431 to determine the storage location of the backup data. In this embodiment, the volume information associated with the backup data is created in the cache memory 111.

In the backup operation for the open-system volume according to this embodiment, first all operations on the open system 2 that use the open-system volume 52, which is the volume to be backed up, are stopped. After stopping operations, the open system 2 unmounts the volume 52 (or executes a command from the OS using the volume) (step 1101). Next, the volume information creation/data set allocation module 1121 of the backup software 112 generates volume information and a volume serial number for the external storage apparatus 5 connected to the open system 2. These are stored in the cache memory 111 of the main memory 11. The cache memory 111 is treated as though it contains an imaginary volume. In this example, the volume information is stored in the cache memory 111 but it would also be possible to store the volume information elsewhere. To simplify operations, it would be desirable to have the device filename used by the open system 2 associated with the volume serial number. Also, the volume serial number is assigned by the system within a range of numbers so that the data can be identified as belonging to the external storage apparatus 5. The volume serial number is managed and handled by the user (step 1103).

The backup software 112 generates volume information. This volume information is used to request the storage control processor to read the backup data and begin performing the backup operation (step 1104). The storage control processor 14 uses volume serial number identifying means 142 to determine if the specified volume serial number is within a numerical range associated with data from the external storage apparatus 5. If the specified volume serial number is not within a range associated with data from the external storage apparatus 5, the open-system volume in the external storage apparatus 4 is backed up. Thus, in this case operations similar to the one at step 1303 are performed (step 1105). If the specified volume serial number is within the range associated with data from the external storage apparatus 5, the storage control processor 14 uses the communication line 34 to request the open system 2 to read data. In response to this request, the open system 2 starts a backup program and reads backup data from the open-system volume. This data is transferred via the communication line 34 to the storage control processor 14 (step 1106). The storage control processor 14 uses the data format converter 141 to convert the data transferred from the open system 2 into the variable-length block format while generating virtual C fields (step 1107). This allows the data to be used by the operating system 113 of the mainframe 1. The storage control processor 14 sends the converted data to the operating system 113. The data sent to the operating system 113 is stored in the backup apparatus 3 by the backup software 112 (step 1108). The storage control processor 14 then checks to see if there is any remaining backup data from the open system 2. If there is backup data remaining, the operations from step 1107 through step 1108 are repeated (step 1109). Once all the backup data has been processed, the storage control processor 14 reports that the backup operation has been completed. The open system 2 mounts the open-system volume 53 and resumes operations (step 1110).

Another method is to backup data after a certain amount of data has been collected from the open system 2.

To restore a backup, the backup software 112 reads the backup data stored in the backup apparatus 3 and uses the data format converter 141 to convert the data to the fixed-length block format. The storage control processor 14 transfers the data converted to the fixed-length block format to the open system 2 via the communication line 34. The open system 2 restores this data to the open-system volume 52.

In the embodiment described above, data stored in the external storage apparatus 5, which is used exclusively by the open system 2, is backed up by going through the open system 2. Instead of the method described above, it would also be possible to have the communication unit 15 of the mainframe 1 connected to the communication unit 35 of the external storage apparatus 5 so that data can be backed up without going through the open system 2. In this case, a backup software 112 would prepare for the backup beforehand by generating a volume serial number and volume information for the external storage apparatus 5 (the open-system volume 52), which would then be stored in the cache memory 111. The backup operation could then be performed in a manner similar to the backup of the open-system volume 43 indicated by the flowchart in FIG. 7. In order to prevent access errors with the external storage apparatus 5, mainframe 1 would keep the external storage apparatus 5 unmounted or the communication line 35 off-line at most times. Then, when the backup software 112 is started, the mainframe 1 would make the external storage apparatus 5 accessible.

Figure 10:
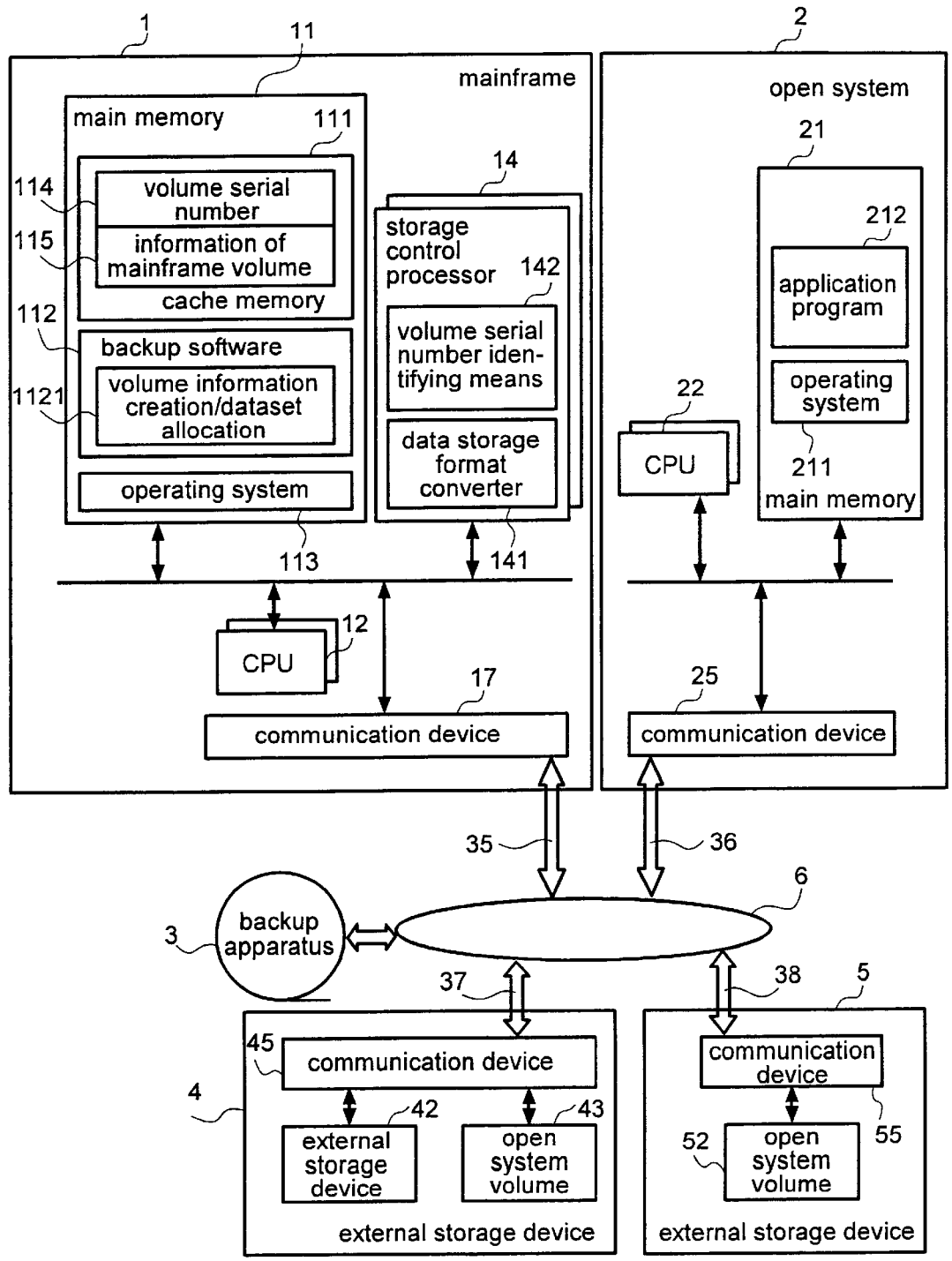
FIG. 10 is a block diagram showing the architecture of a computer system according to yet another embodiment of the present invention.

FIG. 10 is a block diagram showing the architecture of a computer system according to yet another embodiment of the present invention. In the computer system according to this embodiment, an external storage apparatus network 6 connects: a mainframe 1; an open system 2; a backup apparatus 3; and external storage apparatuses 4, 5. The external storage apparatus network 6 is connected to the different elements by communication lines 34, 35, 36, 37, and 38. The mainframe 1, the open system 2, and the external storage apparatuses 4, 5 include communication units 17, 25, 45, and 55 respectively in order to communicate with other devices via the external storage apparatus network 6. Under normal conditions, the external storage apparatus 4 can be accessed from the mainframe 1, and the external storage apparatuses 4, 5 can be accessed from the open system 2. The cache memory 111 of the mainframe 1 holds a volume serial number 114 and volume information 115 corresponding to the open-system volume 52 in the external storage apparatus 5. These are generated by the backup software 112 before a backup is performed.

The backup operation in this embodiment is implemented in a similar manner as the backup operation of the open-system volume 43 described above with reference to the flowchart in FIG. 7, except that the transfer of backup data takes place via the external storage apparatus network 6 between the mainframe 1, the corresponding external storage apparatus, and the backup apparatus 3.

According to the embodiment described above, in a computer system that includes both mainframes and open systems, data from disk storage apparatuses or the like connected to and used by open systems can be backed up to a backup apparatus 166 connected to a mainframe. Also, open-system data can be backed up while data is being retrieved by the mainframe. This eliminates the need for the mainframe to create a backup volume in the external storage apparatus, allowing the backup operation to be performed quickly and eliminating the need to allocate storage capacity for the backup operation.

The present invention is not restricted to the embodiments described above. For example, it is not necessary for there to be only one mainframe and one open system in a single system. Two or more of each can be present. Similarly, it would be possible to use any number of external storage apparatuses.

What is claimed is:

1. In a computer system including: a first computer; a second computer connected to said first computer via a communication line; a first storage apparatus connected to said first computer; a second storage apparatus connected to said second computer via a fixed-length access interface and storing data in a fixed-length block format used by said second computer; and a backup apparatus connected to said first computer via a variable length access interface and storing data in a variable-length block format;

a backup method for backing up data stored in said second storage apparatus to said backup apparatus comprising the steps of:

making volume information for accessing data stored in said first or second storage apparatus from said first computer in said first computer;

selecting said second storage apparatus based on said volume information using said first computer;

requesting, from said first computer to said second computer via the communication line, the reading of data stored in said second storage apparatus in said fixed-length block format;

reading, in response to said request, data in said fixed-length block format from said second storage apparatus using said second computer via said fixed length access interface and transferring said data to said first computer via said communication line;

converting, in said first computer, data in said fixed-length block format to data in said variable-length block format; and transferring said data in said variable-length block format to said backup apparatus via said variable length access interface.

2. A method as described in claim 1, wherein said step for making said volume information comprises a step for storing said volume information in a predetermined region formed in a main memory of said first computer.

3. A method as described in claim 1, wherein said volume information which includes information of a starting position and an ending position of data in said fixed-length block format in said second storage apparatus; and wherein said selecting step further comprises:

getting a volume serial number indicating an area in which data for backing up are stored; and checking whether said area is within a memory range determined by said starting position and said ending position of data in said second storage apparatus which is indicated by said volume information, wherein said requesting step executed when the area is within the memory range of said second storage apparatus, by said first storage apparatus.

4. A method as described in claim 3, further comprising the steps of:

reading data stored in said first storage apparatus when the area is not within the memory range of said second storage apparatus using said first computer.

5. A method as described in claim 4, wherein said second storage apparatus is connected to said first computer via another fixed-length access interface, and method further comprising the steps of:

reading data stored in said second storage apparatus via said another fixed-length access interface when the area is within the memory range of said second storage apparatus.

6. A method as described in claim 5, further comprising the steps of:

stopping execution of application of said second computer using said second storage apparatus and unmounting a volume included in said second storage apparatus before execution of said making step; and mounting said volume and restarting said application after execution of said transferring step.

7. A method as described in claim 6, wherein said transferring step is executed after collecting a certain amount of data sent from said second storage apparatus.

8. In a computer system including: a first computer; a second computer connected to said first computer via a communication line; a first storage apparatus connected to said first computer; a second storage apparatus connected to said first computer via a fixed-length access interface and connected to said second computer and storing data in a fixed-length block format used by said second computer; and a backup apparatus connected to said first computer via a variable length access interface and storing data in a variable-length block format;

a backup method for backing up data stored in said second storage apparatus to said backup apparatus comprising the steps of:

making volume information used to access data stored in said second storage apparatus in said fixed-length block format from said first computer in said first computer;

selecting said second storage apparatus based on said volume information using said first computer;

reading said data stored in said second storage apparatus in said fixed-length block format from said second storage apparatus via said fixed-length access interface using said first computer based on information contained in said volume information;

converting, in said first computer, said data in said fixed-length block format into data in said variable-length block format; and transferring said converted data in said variable-length block format to said backup apparatus via said variable length access interface.

9. A computer connected to backup apparatus storing data in a variable-length block format, comprising:

a first communication unit to communicate with another computer which is connected to a second storage apparatus, a second communication unit using a variable-length access interface connected to said backup apparatus and, a third communication unit connected to a first storage apparatus;

a processor and;

a memory, wherein said processor stores volume information in said memory, selects said second storage apparatus for accessing based on said volume information, requests said another computer to send data stored in said second storage apparatus in fixed-length block format through said first communication unit, receives said data from said another computer through said first communication unit, converts said data to data in variable-length block format and transfers said converted data to said backup apparatus through said second communication unit.

10. A computer as described in claim 9, wherein said processor receives a volume serial number which indicates an area in which data for backing up are stored, checks whether said area is within a memory range of said second storage apparatus and requests said another computer to send said data through said first communication unit when the area is within the memory range of said second storage apparatus.

11. A computer as described in claim 10, wherein said processor reads data stored in said first storage apparatus via said third communication unit when the area is not within the memory range of said second storage apparatus.

12. A computer as described in claim 11, further comprising a fourth communication unit using a fixed-length access interface connected to a second storage apparatus, wherein said processor reads data stored in said second storage apparatus via said fourth communication unit when the area is within the memory range of said second storage apparatus.

13. A system comprising:

a first computer, a second computer connected to said first computer through communication line, a backup apparatus connected to said first computer via a variable length access interface storing data in a variable-length block format;

a first storage apparatus connected to said first computer; and a second storage apparatus storing data in a fixed-length block format connected to said second computer via a fixed-length access interface, wherein said first computer makes volume information, selects said second storage apparatus based on said volume information, requests said second computer to send data stored in said second storage apparatus, wherein said second computer reads said data stored in said second storage apparatus via said fixed-length access interface and transfers said data to said first computer via said communication line based on said request, and wherein said first computer receives said transferred data, converts said received data to a variable-length block format and transfers said converted data to said backup apparatus via said variable length access interface.

14. A system according to claim 13, wherein said, second storage apparatus connected to said first computer via another fixed-length access interface, wherein said first computer reads data stored in said second storage apparatus from said second storage apparatus via said another fixed-length access interface when said first computer selects said second storage apparatus by using said volume information.

15. A system according to claim 14, wherein said first computer generates the information to identify volume.

* * * * *